United States Patent [19]

Latvis et al.

[11] Patent Number: 5,734,148
[45] Date of Patent: Mar. 31, 1998

[54] RETENTION MEANS FOR SIDE PANELS FOR WELDING MACHINE

[75] Inventors: Steven D. Latvis, Appleton; Ross C. Borchardt, Hortonville, both of Wis.

[73] Assignee: Miller Electric Manufacturing Co., Appleton, Wis.

[21] Appl. No.: 526,567

[22] Filed: Sep. 11, 1995

[51] Int. Cl.⁶ .................................................. B23K 9/00
[52] U.S. Cl. ........................... 219/133; 290/1 A; 403/375; 403/DIG. 10
[58] Field of Search ........................ 219/133, 136; 174/66, 67; 248/239, 310, 672, 673, 675; 290/1 A; 403/353, 375, 380, DIG. 10; 52/510, 588.1

[56] References Cited

U.S. PATENT DOCUMENTS

| | | | |
|---|---|---|---|
| 2,708,088 | 5/1955 | Steinke | 248/239 |
| 3,156,282 | 11/1964 | Bedford, Jr. | 403/375 |
| 5,489,162 | 2/1996 | LoCicero et al. | 403/353 |

FOREIGN PATENT DOCUMENTS

| 53-55435 | 5/1978 | Japan | 219/136 |
|---|---|---|---|

*Primary Examiner*—Clifford C. Shaw
*Attorney, Agent, or Firm*—Mark W. Croll; Thomas W. Buckman; John P. O'Brien

[57] ABSTRACT

A side panel is easily installable onto and removed from a welding machine using a minimum of fasteners and requiring only a small space on the side of the machine. The side panel includes clips joined to one edge of the panel. The clips have respective first legs secured to the panel, second legs that register with slots in the machine base, and third legs that elastically bend against a lip on the base. The restoring force of the bent third legs of the clips holds the clips second legs firmly against the base slot and thereby prevents vibration. Conventional fasteners are used to attach at least one other edge of the panel to the welding machine.

2 Claims, 8 Drawing Sheets

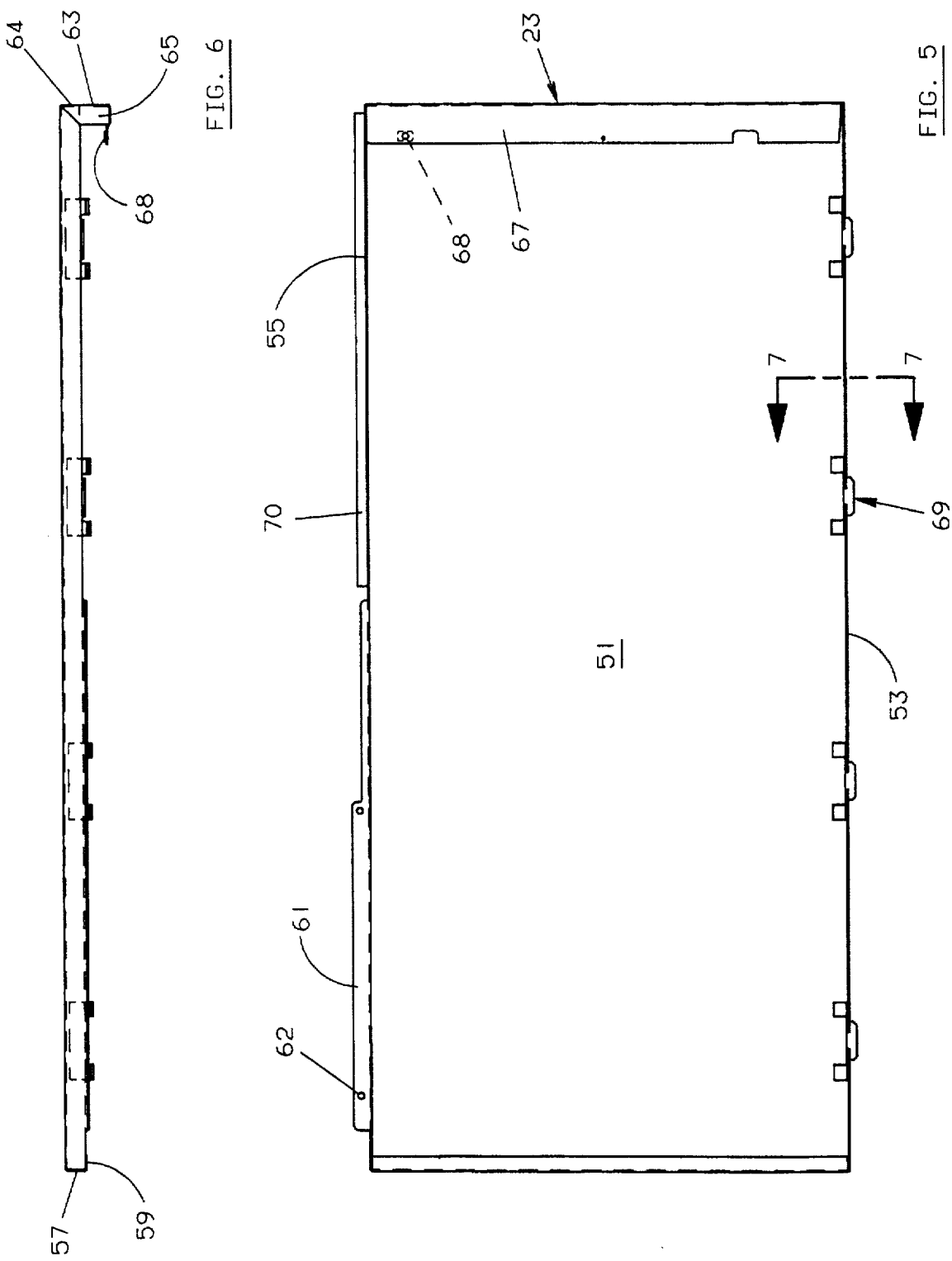

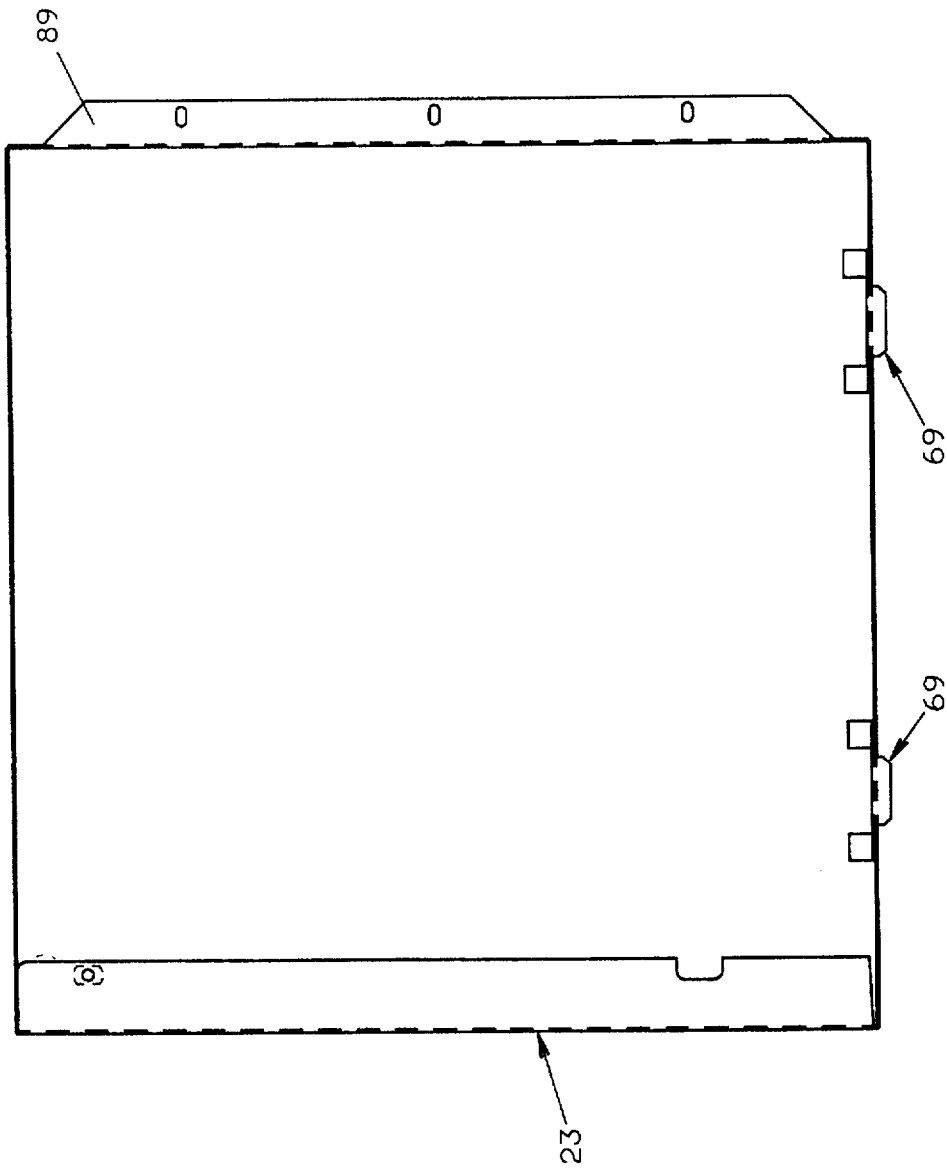

ized into an enclosure having a floor, a top wall, two end walls, and two side walls. A vertical center wall divides the enclosure into an engine compartment and an electrical compartment. The floor, top wall, center wall, and end walls normally stay permanently in place after manufacture of the welding machine. On the other hand, to provide access to the engine and electrical compartments r the enclosure side walls are removable.

Prior enclosures for self-contained welding machines employed side panels that were hinged to the top wall. Those side panels were satisfactory to the extent that they did allow easy access to the engine and electrical compartments. However, the hinged side panels required a great deal of space between the welding machine and any adjacent objects or building walls. Consequently, the placement of the welding machine was limited to locations having sufficient adjacent space to enable the side panels to be opened. For example, if the welding machine were mounted on a trailer, the trailer fenders either could not be close to the machine or they could not extend above the bottom edges of the side panels.

Thus, a need exists for improvements in welding machine enclosures.

SUMMARY OF THE INVENTION

In accordance with the present invention, a retention means is provided that enables side panels to be installed on and removed from a self-contained welding machine within minimal space. This is accomplished by apparatus that includes elastic clips joined to one edge of a panel for retaining that panel edge to the welding machine without fasteners.

Each elastic clip has three legs. The first leg is flat and is secured to a surface of the panel. The second leg is at right angles to the first leg. The third leg of the elastic clip extends at an obtuse angle from the junction of the first and second legs. Preferably, the third leg is bent so as to have two sections.

The second legs of the clips register with associated slots in a stationary component of the welding machine, such as a base. The base slots may be formed in a horizontal ledge. The panel edge to which the clips are joined rests on the base ledge. Simultaneously, the third legs of the clips contact and press against a lip that upstands from the base ledge. The third legs elastically bend against the lip so as to force the second legs into firm contact with their associated slots. That action prevents any vibrations between the base and the panel edge adjacent the clips. Thumb latches or other fasteners on one or more other panel edges complete the installation.

The method and apparatus of the invention, using elastic clips, thus enables a panel to be removed from and installed on a welding machine within a minimum of space. The elastic clips coact with the machine base to prevent panel vibrations even though no fasteners are used on the panel edge having the clips.

Other advantages, benefits, and features of the present invention will become apparent to those skilled in the art upon reading the detailed description of the invention.

BRIEF DESCRIPTION OF THE DRAWINGS

FIG. 5 is a front view of a panel according to the present invention for the first side of the self-contained welding machine of FIGS. 1 and 2.

FIG. 6 is a top view of FIG. 5.

FIG. 9 is a front view of another panel for the self-contained welding machine of FIGS. 1 and 2.

FIG. 10 is a top view of FIG. 9.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
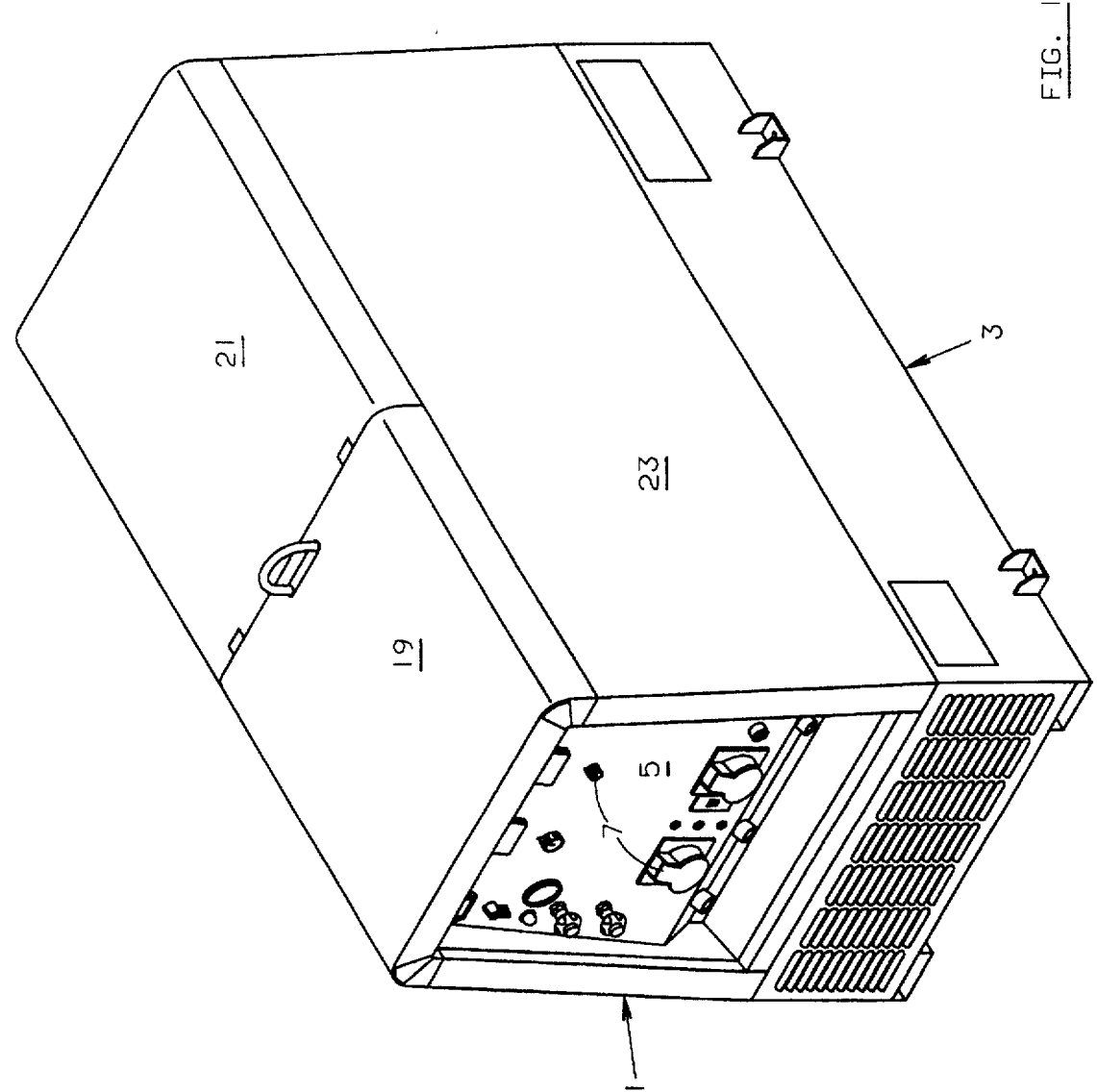
FIG. 1 is a perspective view of the front end and first side of a typical self-contained welding machine that advantageously includes the present invention.
Figure 2:
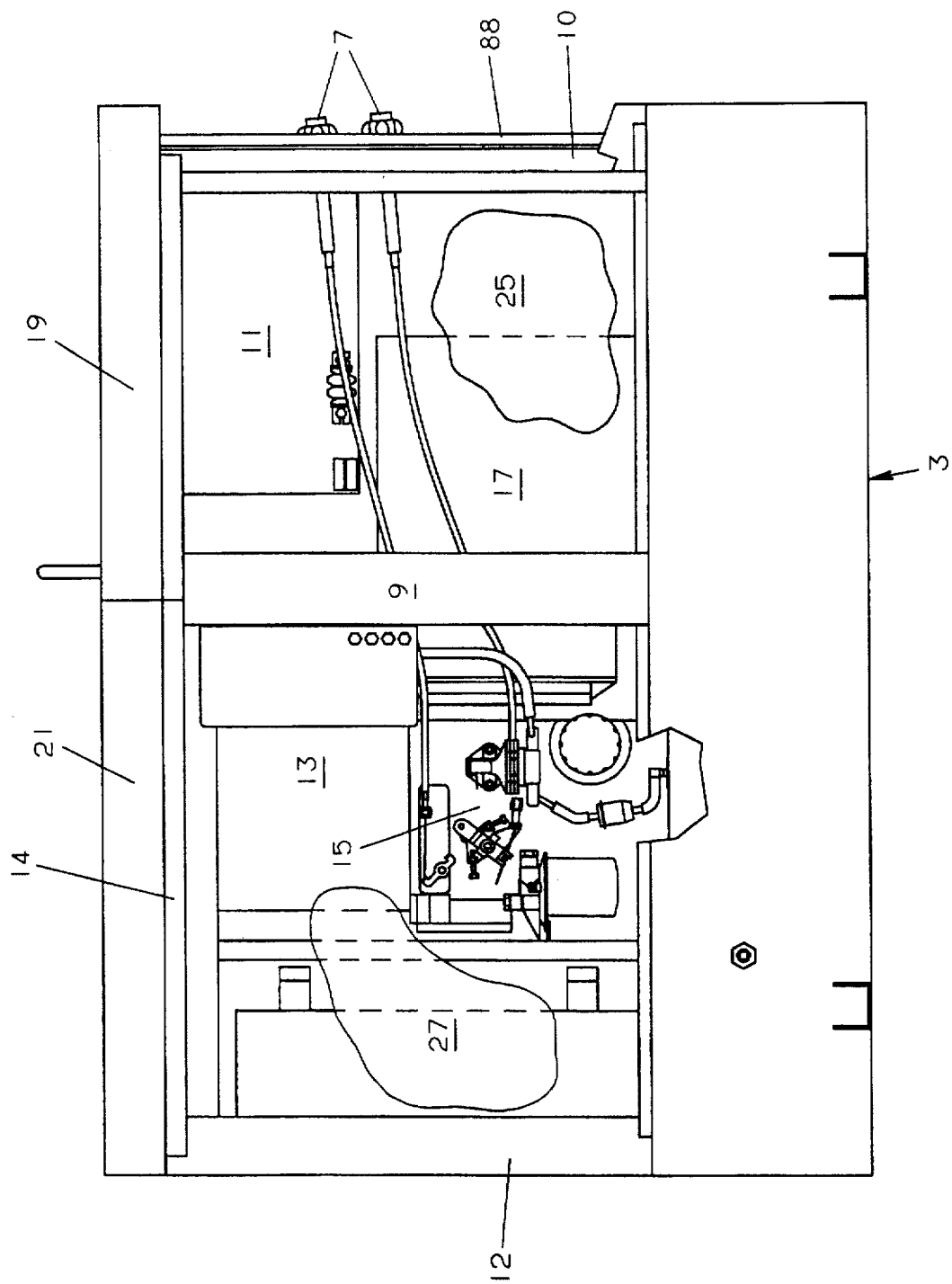
FIG. 2 is a partially broken view of a second side of the self-contained welding machine of FIG. 1.

Referring to FIGS. 1 and 2, a self-contained electric welding machine 1 is illustrated that includes the present invention. The particular self-contained welding machine 1 shown is merely representative of a wide variety of electric welding machines, well known in the art, having various sizes, features, and ratings.

Briefly, the self-contained welding machine 1 is comprised of a base 3, a front panel 5 with control knobs and levers 7, and a center wall 9 upstanding from the base. A front frame 10 upstands from the base 3 and holds the front panel 9 in place. A back frame 12 upstands from the back end of the base. A horizontal frame 14 extends between the top ends of the front and back frames 10 and 12, respectively. A first cover 19 is attached to the center wall 9 and the front frame 10. A second cover 21 is hinged to the center wall.

The center wall 9 divides the welding machine 1 into an electrical compartment 11 and an engine compartment 13. A prime mover such as an internal combustion engine 15 in the engine compartment 13 drives a generator 17 located in the electrical compartment 11. Electrical power from the generator 17 is converted by various electrical components, not shown, into power suitable for welding, as is known in the art.

In accordance with the present invention, the sides of the self-contained welding machine 1 are removably closable with vibration proof side panels that require minimal space for installation and removal. In the illustrated construction, a large panel 23 closes both the electrical compartment 11 and the engine compartment 13 on one side of the machine. Separate panels 25 and 27 are used to close the electrical and engine compartments, respectively, on the other side of the machine.

Figure 3:
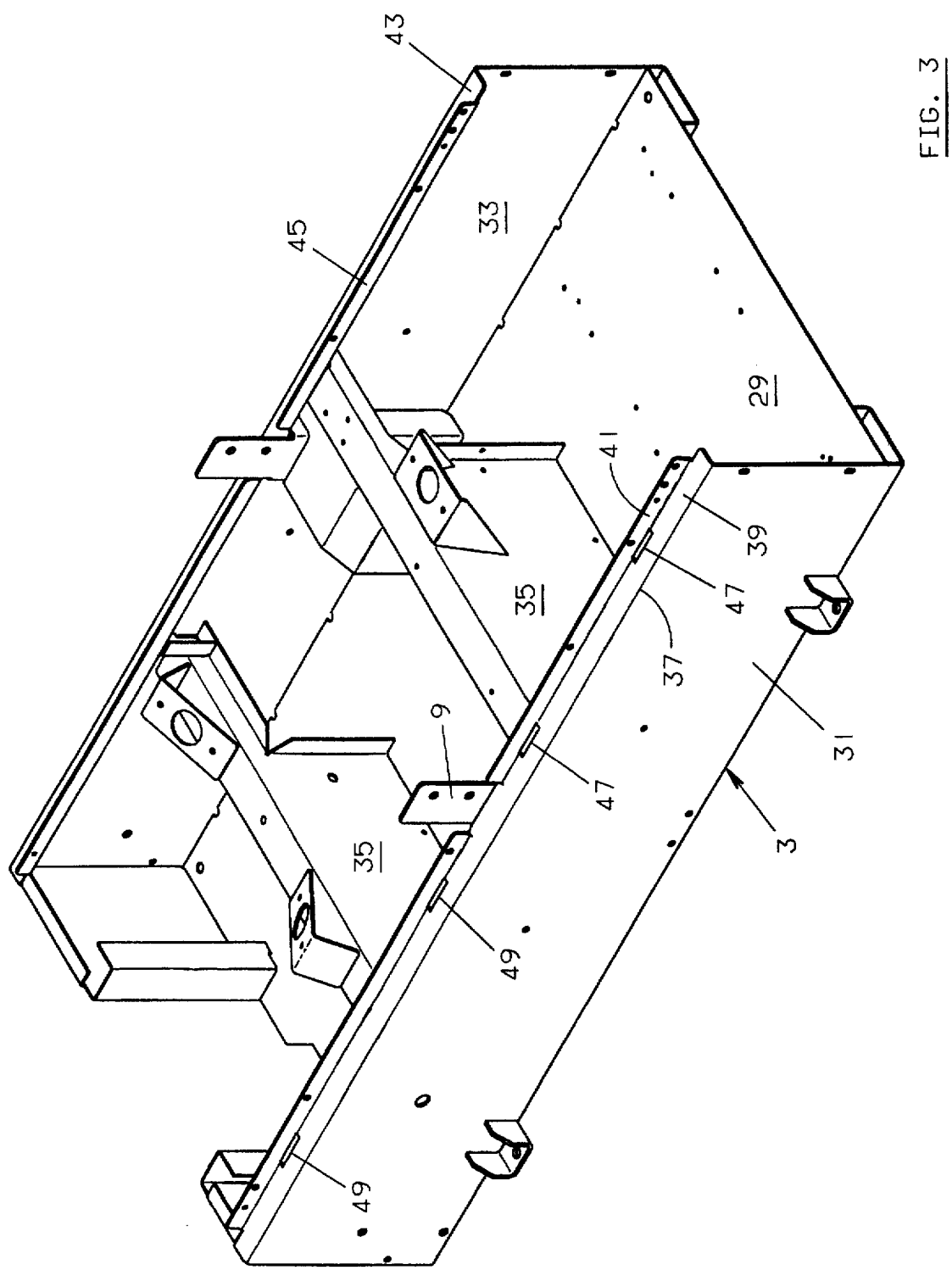
FIG. 3 is a perspective view of the base of the self-contained welding machine of FIGS. 1 and 2.

To provide their beneficial features, the panels 23, 25, and 27 coact with the base 3. Looking also at FIGS. 3 and 4, the base has a floor 29, two vertical side walls 31 and 33, and some interior bracings 35. The top of the side wall 31 is bent to form a horizontal ledge 39. The ledge 39 terminates in a short vertical lip 41. At least one and preferably two pairs of slots 47 and 49 are formed in the ledge 43 between the center wall 9 and the front and back frames 10 and 12, respectively. Similarly, the base vertical wall 33 has a horizontal ledge 43 with slots 44 and a vertical lip 45.

Figure 7:
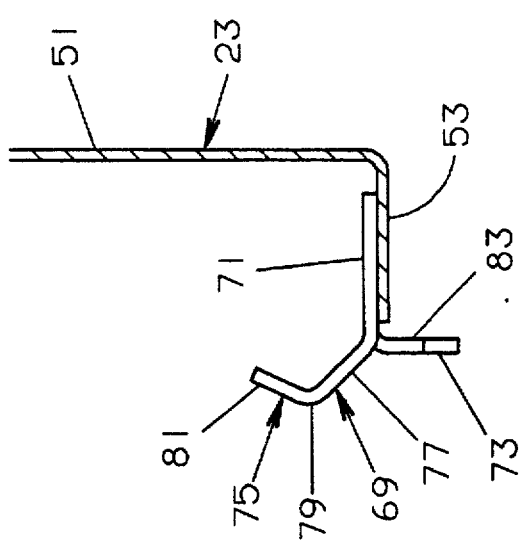
FIG. 7 is an enlarged cross sectional view taken along line 7—7 of FIG. 5.

Now turning to FIGS. 5–7, the panel 23 is fabricated from a blank of sheet metal such that it has a main panel section 51, a bottom flange 53, a top flange 55, and a back end flange 57 with a bent-over tab 59. A tab 61 upstands from a portion of the top flange 55 opposite the back end flange 57. Two or more holes 62 extend through the tab 61. A gasket 70 is bonded to the top flange near its front end. At the front end of the panel is a short leg 63 having a main panel section 64, a top flange 65, and an end flange 67. A nut 68 is welded to the end flange 67 near the top flange 65. A layer of insulating foam, not illustrated in the drawings, may be bonded to the main panel section 51 between the top and bottom flanges 55 and 53, respectively.

Joined, as by welding, to the bottom flange 63 of the panel 23 are a number of clips 69. Each clip 69 has a first leg 71 that is secured to the panel bottom flange. A second leg 73 extends at a right angle from the first leg 71. A third leg 75 extends from the junction of the first and second legs. In the preferred embodiment, the third leg 75 is formed with a first section 77 and a second section 81 that are separated by a bend line 79. The first section 77 extends at approximately a 135 degree angle to both the first and second legs.

Figure 4:
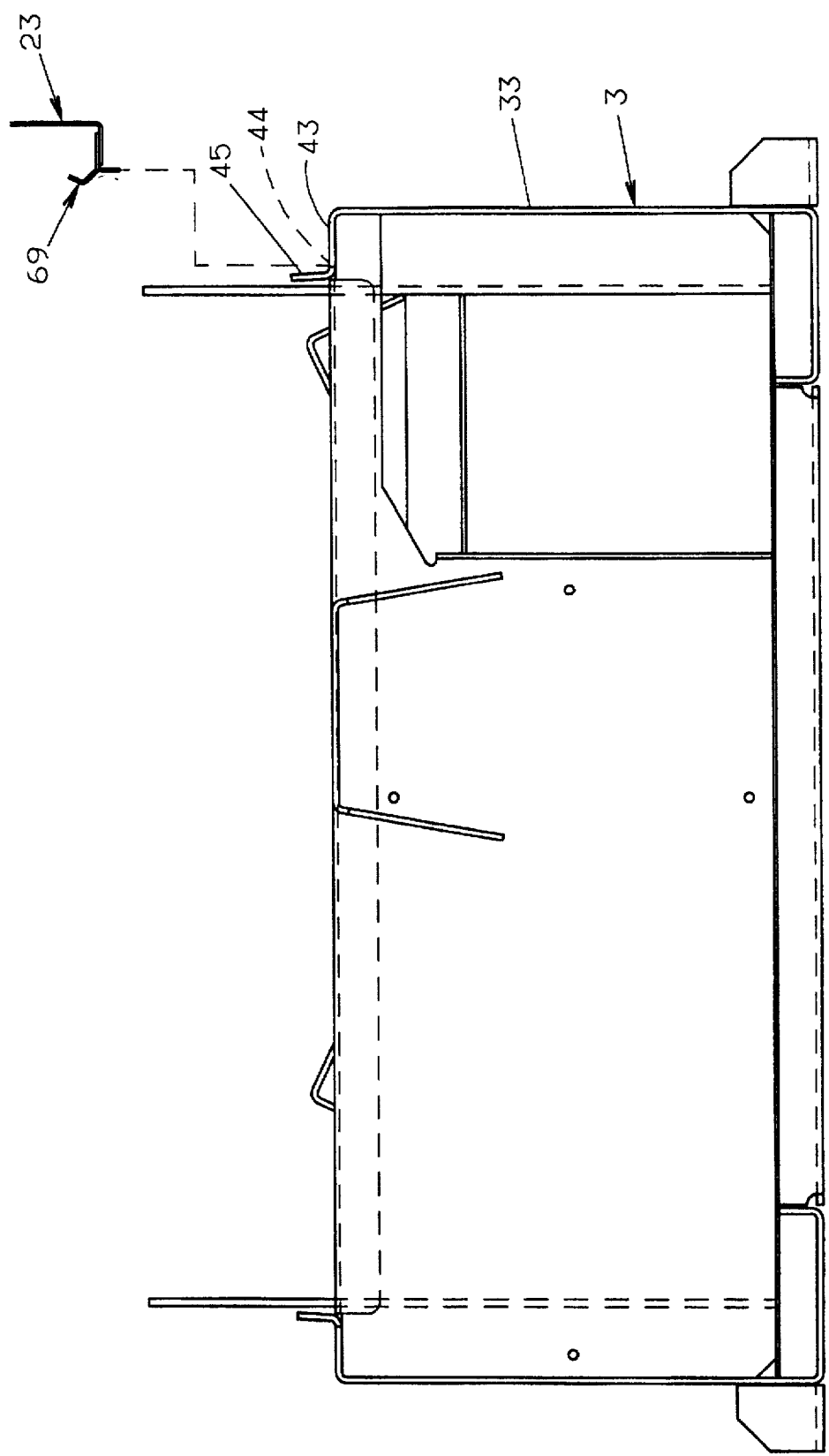
FIG. 4 is an end view of the base of FIG. 3.

The clips 69 are located on the panel 23 such that their second legs 73 register with the slots 44 in the base 3 (FIG. 4). Accordingly, the panel can be manually positioned above the base ledge 43 with the clips above the corresponding slots. The panel is lowered such that the clip second legs enter the slots, and the panel flange 53 rests on the base ledge. With the clips in place, the panel is pushed against the top frame 14 and against the front and back frames 10 and 12, respectively, of the welding machine 1. The gasket 70 bears against the machine cover 19. A gasket 88 on the machine front frame seals against the panel end flange 67 (FIG. 2).

Simultaneously, the bend lines 79 of the clips 69 contact the base vertical lip 45 so as to elastically bend the third legs 75. The restoring forces of the bent legs 75 exert forces on the clips and thus on the entire panel 23 in a direction away from the base lip. The restoring forces of the clip third legs urge the front surfaces 83 of the clip legs 73 into firm contact with the edges of the corresponding base slots 44. The clips are designed such that their third legs are bent against the lip 45 and thus continue to exert forces on the panel when the second leg surfaces 83 are against the edges of their respective slots. With the clips in place, conventional fasteners, not shown, are used to attach the panel tab 61 to the machine top frame 14. Another fastener mates with the welding nut 68 from inside the welding machine electrical compartment 11. In that manner, the panel is installed on the machine with minimum fasteners and with a minimum side space requirement.

The panel 23 is removed from the welding machine 1 by a reverse process. That is, the fasteners are removed from the tab 61 and weld nut 68, and the panel is lifted to pull the clip second legs 73 from the slots 44.

Figure 8:
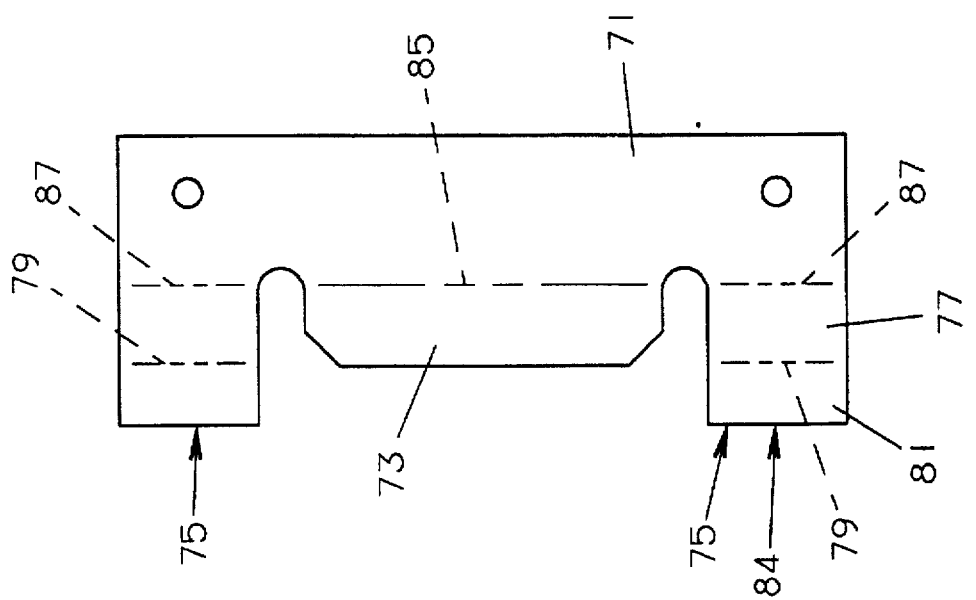
FIG. 8 is a front view of a blank of material from which the clip of the invention can be formed.

FIG. 8 shows a blank 84 of metal from which the clip 69 can be made. The second leg 73 is bent downwardly along fold line 85 relative to the first leg 71. The blank 84 is designed such that there are two third legs 75, each of which is bent upwardly relative to the first leg along a respective fold line 87. The third legs are formed into their first and second sections 77 and 81, respectively, by bending them along the bend lines 79.

FIGS. 9 and 10 show the panel 25, which is generally similar to the panel 23. Two clips 69 are employed for registering with the slots 47 in the base 3. Conventional fasteners attach the panel tab 89 to the machine center wall 9, thereby complying with codes that require tools for removing the panel from over the electrical compartment 11.

Figure 11:
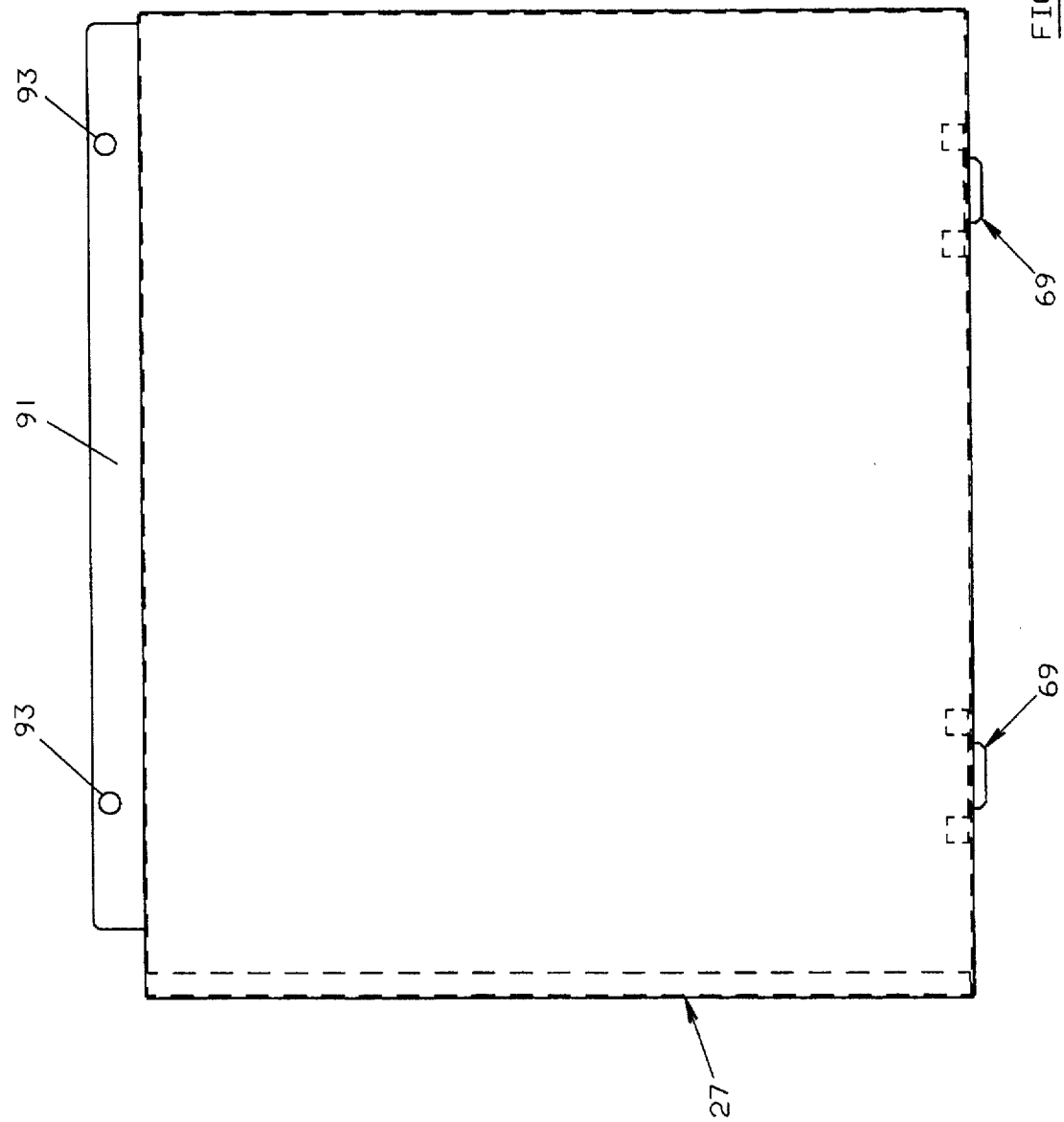
FIG. 11 is a front view of another panel for the self-contained welding machine of FIGS. 1 and 2.

FIG. 11 shows the panel 27. The two clips 69 register with the slots 49 in the machine base 3. The tab 91 is attached to the top frame 14 of the machine 1 by fasteners passing through the holes 93.

Thus, it is apparent that there has been provided, in accordance with the invention, retention means for side panels for welding machines that fully satisfy the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A welding machine comprising:
   a. a base having a floor and first and second walls upstanding therefrom, each wall having a horizontal ledge with at least one slot therethrough and terminating in an inner upstanding lip;
   b. means mounted to the base for producing welding power;
   c. frame means upstanding from the base for defining first and second compartments;
   d. a plurality of panels removably installed on the welding machine for selectively closing and providing access to the first and second compartments, each panel comprising:
      i. a main panel section having a first lower edge, a second upper edge and a flange at generally right angles to the main panel section along said first edge; and
      ii. retention means comprising at least one elastic clip comprising:
         a) a first leg secured to the panel flange;
         b) a second leg generally perpendicular to the first leg, the second leg registering with the slot in the base ledge; and
         c) at least one third leg extending at an obtuse angle to the first and second legs, the third leg elastically bending against the base inner lip to force the clip and the panel away from the base inner lip and the clip second leg into firm contact with the slot in the base ledge; and
   e. means for fastening the second upper edges of the panels to the frame means.

2. The welding machine of claim 1 wherein:
   a. the clip third leg is comprised of a first section joined to the clip first and second legs and a second section joined to the clip first section along a bend line; and
   b. the bend line in the clip third leg is in contact against the base lip.

* * * * *